(12) United States Patent
Chen et al.

(10) Patent No.: US 12,400,339 B2
(45) Date of Patent: Aug. 26, 2025

(54) METHOD FOR TRAINING ADAPTIVE RIGID PRIOR MODEL, AND METHOD FOR TRACKING FACES, ELECTRONIC DEVICE, AND STORAGE MEDIUM

(71) Applicant: BIGO TECHNOLOGY PTE. LTD., Singapore (SG)

(72) Inventors: Wenyu Chen, Guangzhou (CN); Gengdai Liu, Guangzhou (CN)

(73) Assignee: BIGO TECHNOLOGY PTE. LTD., Singapore (SG)

(*) Notice: Subject to any disclaimer, the term of this patent is extended or adjusted under 35 U.S.C. 154(b) by 359 days.

(21) Appl. No.: 17/997,107

(22) PCT Filed: Apr. 15, 2021

(86) PCT No.: PCT/CN2021/087576
§ 371 (c)(1),
(2) Date: Oct. 25, 2022

(87) PCT Pub. No.: WO2021/218650
PCT Pub. Date: Nov. 4, 2021

(65) Prior Publication Data
US 2023/0177702 A1    Jun. 8, 2023

(30) Foreign Application Priority Data
Apr. 29, 2020  (CN) .......................... 202010355935.7

(51) Int. Cl.
*G06T 7/246* (2017.01)
*G06T 7/50* (2017.01)
(Continued)

(52) U.S. Cl.
CPC ................ *G06T 7/246* (2017.01); *G06T 7/50* (2017.01); *G06T 19/20* (2013.01); *G06V 10/774* (2022.01);
(Continued)

(58) Field of Classification Search
CPC ..................... G06T 7/246; G06T 19/20; G06T 2207/10016; G06T 2207/30201;
(Continued)

(56) References Cited

U.S. PATENT DOCUMENTS 10,949,648 B1 * 3/2021 Cao .................... G06V 40/161
2007/0071288 A1 3/2007 Wu et al.
(Continued)

FOREIGN PATENT DOCUMENTS

| CN | 102479388 A | 5/2012 |
|----|-------------|--------|
| CN | 103310204 A | 9/2013 |

(Continued)

OTHER PUBLICATIONS

International Search Report of the International Searching Authority for State Intellectual Property Office of the People's Republic of China in PCT application No. PCT/CN2021/087576 issued on Jul. 21, 2021, which is an international application to which this application claims priority.

(Continued)

*Primary Examiner* — Sumati Lefkowitz
*Assistant Examiner* — Connor L Hansen
(74) *Attorney, Agent, or Firm* — Kolitch Romano Dascenzo Gates LLC

(57) ABSTRACT

Provided is a method for training an adaptive rigid prior model. The method includes: initializing model parameters of the adaptive rigid prior model; acquiring a plurality of frames of facial data of a same face by face tracking on training video data using the adaptive rigid prior model; updating the model parameters based on the plurality of frames of facial data; determining whether a condition of stopping updating the model parameters is satisfied; stopping updating the model parameters of the adaptive rigid prior model, and acquiring a final adaptive rigid prior model; and returning to the step of acquiring the plurality of frames of facial data of the same face by face tracking on the training video data using the adaptive rigid prior model.

18 Claims, 6 Drawing Sheets

(51) Int. Cl.
  *G06T 19/20* (2011.01)
  *G06V 10/774* (2022.01)
  *G06V 20/40* (2022.01)
  *G06V 40/16* (2022.01)

(52) U.S. Cl.
  CPC .......... *G06V 40/171* (2022.01); *G06V 40/174* (2022.01); *G06T 2207/10016* (2013.01); *G06T 2207/20021* (2013.01); *G06T 2207/20081* (2013.01); *G06T 2207/30201* (2013.01); *G06T 2219/2021* (2013.01); *G06V 20/46* (2022.01)

(58) Field of Classification Search
  CPC ........... G06T 13/40; G06T 2207/20081; G06T 7/251; G06V 40/174; G06V 40/171; G06V 20/46; G06V 10/62; G06V 40/168; G06V 40/173; G06V 40/176; G06V 40/20; G06V 10/774
  See application file for complete search history.

(56) References Cited

U.S. PATENT DOCUMENTS

| | | |
|---|---|---|
| 2014/0334736 A1 | 11/2014 | Niu et al. |
| 2015/0242678 A1 | 8/2015 | Lee et al. |
| 2021/0406516 A1 | 12/2021 | Chen |
| 2022/0028087 A1* | 1/2022 | Hu .......................... G06T 7/11 |

FOREIGN PATENT DOCUMENTS

| | | |
|---|---|---|
| CN | 107341784 A | 11/2017 |
| CN | 109508678 A | 3/2019 |
| CN | 110096925 A | 8/2019 |
| CN | 110135361 A | 8/2019 |
| CN | 111507304 A | 8/2020 |
| WO | 2019223254 A1 | 11/2019 |

OTHER PUBLICATIONS

Beeler, Thabo, et al.; "Rigid Stabilization of Facial Expressions", ACM Transactions on Graphics (TOG), vol. 33, No. 4, Article 44, Jul. 2014.

Cao, Chen, et al.; "Stabilized Real-time Face Tracking Via a Learned Dynamic Rigidity Prior", ACM Transactions on Graphics (TOG), vol. 37, No. 6, Article 233, Nov. 2018.

Weise, Thibaut, et al.; "Realtime Performance-based Facial Animation", in ACM transactions on graphics (TOG), vol. 30, No. 4, Article 77, Jul. 2011.

The State Intellectual Property Office of People's Republic of China, First Office Action in Patent Application No. 202010355935.7 issued on Mar. 1, 2023, which is a foreign counterpart application corresponding to this U.S. Patent Application.

* cited by examiner

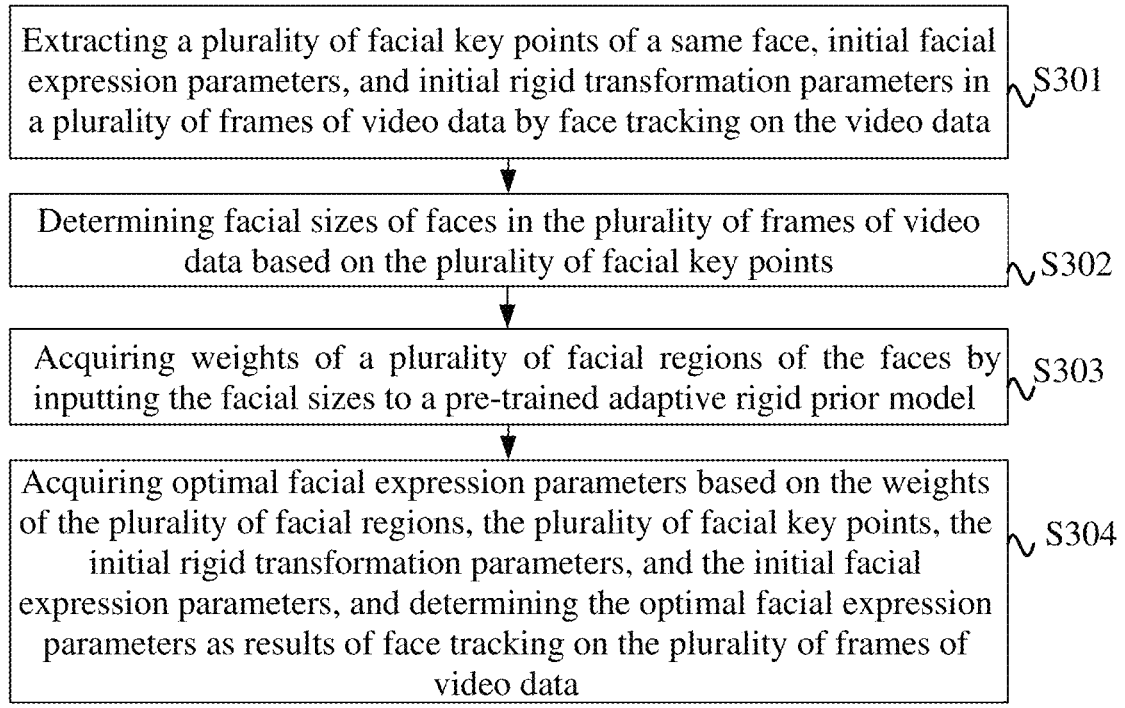
FIG. 3
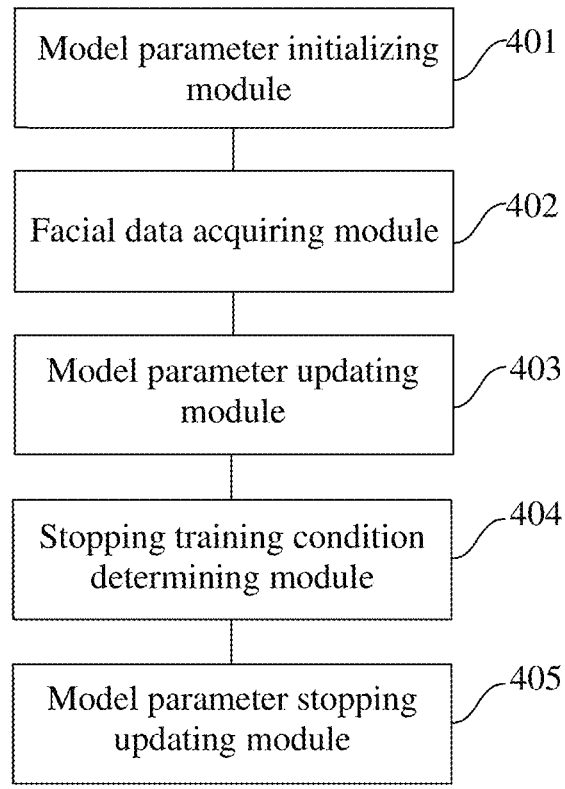

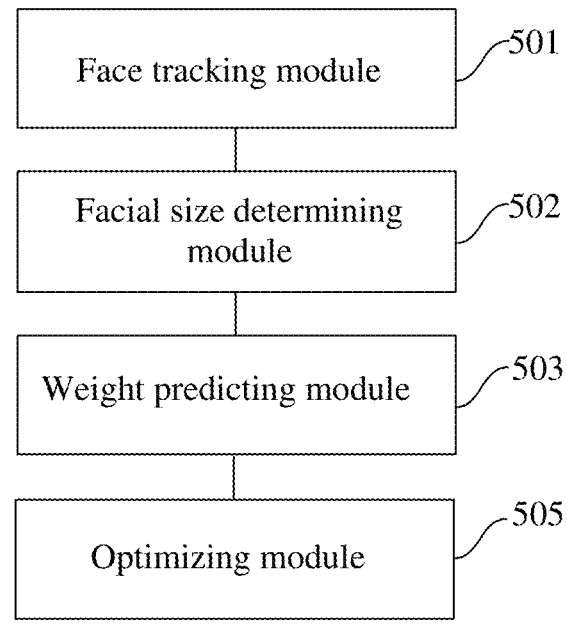
FIG. 5
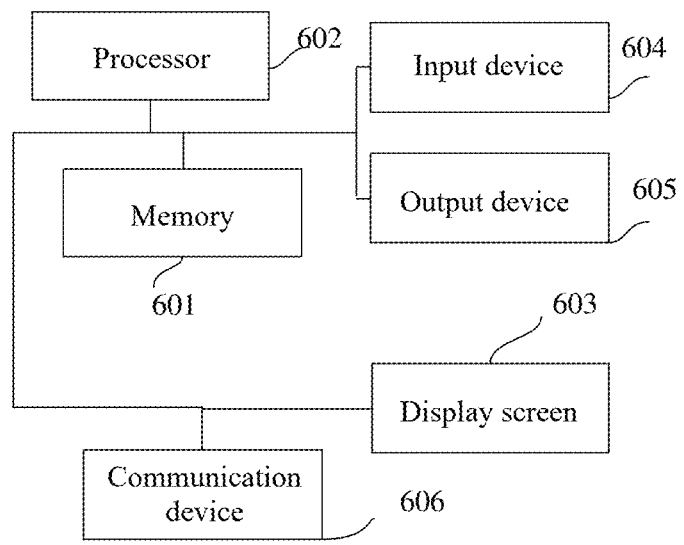

METHOD FOR TRAINING ADAPTIVE RIGID PRIOR MODEL, AND METHOD FOR TRACKING FACES, ELECTRONIC DEVICE, AND STORAGE MEDIUM

CROSS-REFERENCE TO RELATED DISCLOSURE

This application is a U.S. national stage of international application No. PCT/CN2021/087576, filed on Apr. 15, 2021, which is based on and claims priority to Chinese Patent Application No. 202010355935.7 filed on Apr. 29, 2020, and the disclosures of which are herein incorporated by reference in their entireties.

TECHNICAL FIELD

The present disclosure relates to the field of processing images, and for example, relates to a method for training an adaptive rigid prior model, and a method for tracking faces, an electronic device, and a storage medium.

BACKGROUND

Facial pose estimation is a significant topic in tracking faces in videos. Facial poses and facial expressions need to be tracked in real-time face tracking, and the real-time face tracking includes calculating a rigid transformation of a three-dimension face model, for example, rotation, translation, scaling, and the like. Stable facial pose estimation can be used to achieve a vision enhancement effect, for example, trying on hats and glasses, adding beards and tattoos, and the like, and is also applicable to driving virtual characters to change expressions.

SUMMARY

Hereinafter is a summary of the subject matter of the present disclosure described in detail, and the summary is not intended to limit the protection scope of the claims.

Embodiments of the present disclosure provide a method for training an adaptive rigid prior model, and a method for tracking faces, an electronic device, and a storage medium.

According to some embodiments of the present disclosure, a method for training an adaptive rigid prior model is provided. The method includes:
  initializing model parameters of the adaptive rigid prior model, wherein the model parameters are functions with facial sizes as independent variables, and the adaptive rigid prior model is configured to output weights of a plurality of facial regions of faces at different facial sizes;
  acquiring a plurality of frames of facial data of a same face by face tracking on training video data using the adaptive rigid prior model;
  updating the model parameters based on the plurality of frames of facial data;
  determining whether a condition of stopping updating the model parameters is satisfied;
  stopping, in response to the condition of stopping updating the model parameters being satisfied, updating the model parameters of the adaptive rigid prior model, and acquiring a final adaptive rigid prior model; and
  returning, in response to the condition of stopping updating the model parameters being not satisfied, to the step of acquiring the plurality of frames of facial data of the same face by face tracking on the training video data using the adaptive rigid prior model.

According to some embodiments of the present disclosure, a method for tracking faces is provided. The method includes:
  extracting a plurality of facial key points of a same face, initial facial expression parameters, and initial rigid transformation parameters in a plurality of frames of video data by face tracking on the video data;
  determining facial sizes of faces in the plurality of frames of video data based on the plurality of facial key points;
  acquiring weights of a plurality of facial regions of the faces by inputting the facial sizes to a pre-trained adaptive rigid prior model; and
  acquiring optimal facial expression parameters based on the weights of the plurality of facial regions, the plurality of facial key points, the initial rigid transformation parameters, and the initial facial expression parameters, and determining the optimal facial expression parameters as results of face tracking on the plurality of frames of video data;
  wherein the adaptive rigid prior model is trained by the method for training the adaptive rigid prior model according to the embodiments of the present disclosure.

According to some embodiments of the present disclosure, an electronic device is provided. The electronic device includes:
  one or more processors;
  a memory configured to store one or more programs;
  wherein the one or more processors, when loading and executing the one or more programs, are caused to perform the method for training the adaptive rigid prior model and/or the method for tracking the faces according to any one of the embodiments of the present disclosure.

According to some embodiments of the present disclosure, a transitory computer-readable storage medium is provided. The computer-readable storage medium stores one or more computer programs, wherein the one or more programs, when loaded and run by a processor, causes the processor to perform the method for training the adaptive rigid prior model and/or the method for tracking the faces according to any one of the embodiments of the present disclosure.

BRIEF DESCRIPTION OF THE DRAWINGS

FIG. 3 is a flowchart of steps of a method for tracking faces according to some embodiments of the present disclosure;

FIG. 4 is a block diagram of an apparatus for training an adaptive rigid prior model according to some embodiment of the present disclosure;

FIG. 5 is a block diagram of an apparatus for tracking faces according to some embodiments of the present disclosure; and FIG. 6 is a schematic structural diagram of an electronic device according to some embodiments of the present disclosure.

DETAILED DESCRIPTION

It should be noted that the examples and embodiments described herein are merely used to explain the present disclosure, and are not intended to limit the present disclosure. It should be further noted that the accompany drawings merely show structures related to the present disclosure but all structures. The embodiments of the present disclosure can be combined with the features of the embodiments without conflict.

In the real-time face tracking, the facial pose is estimated based on a motion of the face in the video. However, the motion of face in the video is not solely determined by the facial pose. In the case that the facial pose is fixed, different expressions of the user may cause the motion of the facial pose in the video. Thus, for acquiring the stable estimation of facial pose, an effect of the facial expression should be efficiently reduced in optimizing the facial pose, that is, the rigidity is stabilized.

In some practices, for improvement of a calculation efficiency, rigidity stabilization of face tracking is achieved using a prior in a real-time rigidity stabilization method. Common priors are achieved by two relatively simpler methods: a heuristic prior for a specific facial region, and a dynamic rigid prior. For the heuristic prior, a fixed weight is used in different facial regions, but the heuristic prior is not applicable to all expressions. For the dynamic rigid prior, the weight is dynamically estimated by estimating displacements of each facial region, and thus, the dynamic rigid prior is applicable to different expressions. However, a trained model of dynamic rigid prior is merely applicable in a face at a specific size, and is not adaptive to changes of the facial sizes in the video. Thus, the current rigid prior model fails to adapt all expressions and different facial sizes and estimate weights of a plurality of facial regions, resulting in unsatisfied rigidity stabilization of facial pose estimation and poor accuracy of tracking the faces.

Figure 1:
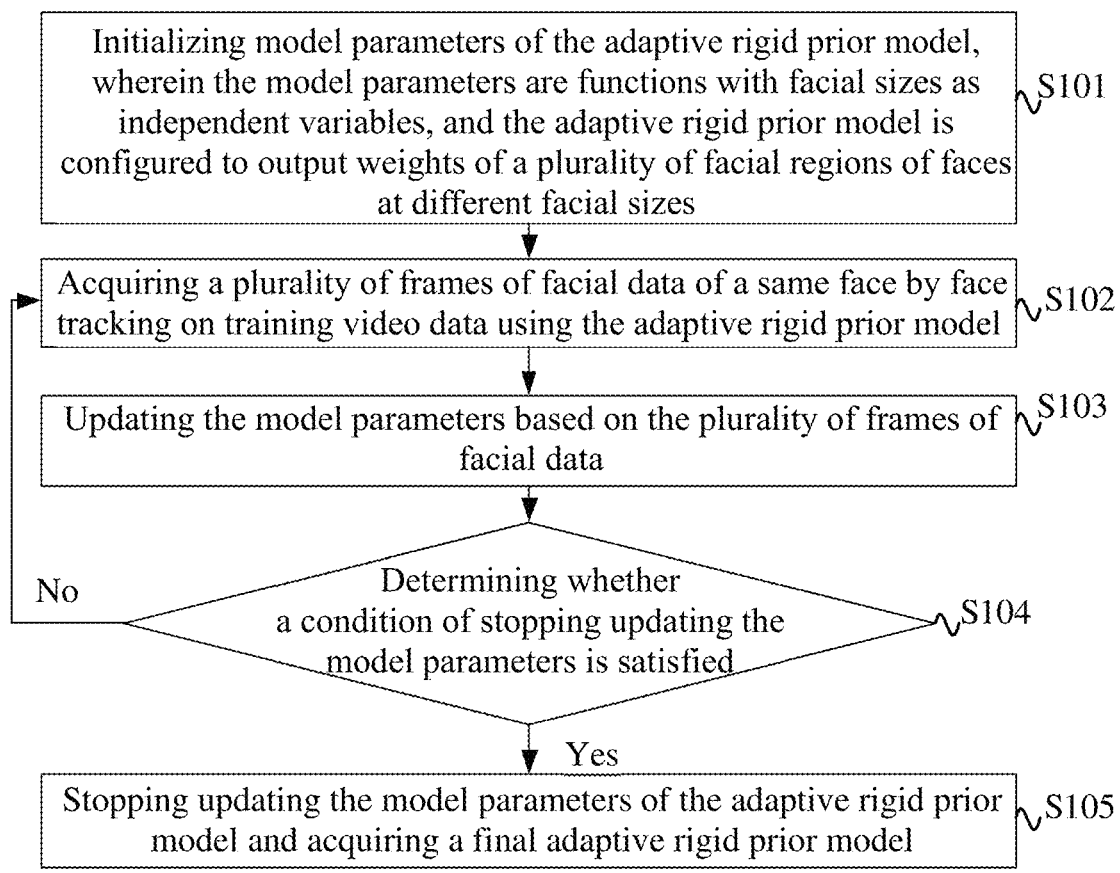
FIG. 1 is a flowchart of steps of a method for training an adaptive rigid prior model according to some embodiments of the present disclosure.

FIG. 1 is a flowchart of steps of a method for training an adaptive rigid prior model according to some embodiments of the present disclosure. The embodiments of the present disclosure are applicable to a case of training a rigid prior model to estimate weights of a plurality of facial regions of faces at different facial sizes. The method is applicable to the apparatus for training the adaptive rigid prior model according to the embodiments of the present disclosure, and the apparatus for training the adaptive rigid prior model is implemented by a hardware or a software, and is integrated in the electronic device according to the embodiments of the present disclosure. In some embodiments, as shown in FIG. 1, the method for training the adaptive rigid prior model includes the following steps.

In S101, model parameters of the adaptive rigid prior model are initialized, wherein the model parameters are functions with facial sizes as independent variables, and the adaptive rigid prior model is configured to output weights of a plurality of facial regions of faces at different facial sizes.

In the embodiments of the present disclosure, the face is divided into a plurality of facial regions. In the case that the face evinces an expression, displacements of the plurality of facial regions of the faces relative to a neutral face are generated. The neutral face is a face of the user without facial expression, and the neutral face is generated for each user. As a motion of each of the plurality of facial regions affects a face rigid transformation, for stable rigid transformation, it is desirable that the facial region with greater displacement has a less weight in the rigid transformation, and the facial region with less displacement has a greater weight in the rigid transformation in facial pose estimation.

In the embodiments of the present disclosure, the adaptive rigid prior model is configured to output the weights of the plurality of facial regions of the faces at different facial sizes, and the model parameters are the functions with the facial sizes as the independent variables.

In S102, a plurality of frames of facial data of a same face are acquired by face tracking on training video data using the adaptive rigid prior model.

In the embodiments of the present disclosure, the training video data is video data of a user. In the faces of the user in the video data, more than half of the faces are faces at different sizes without facial expression, and other faces are faces of the user at different sizes with different facial expressions. The face tracking is a process of extracting facial key points of the same user from the training video data, establishing three-dimension faces, rigidly transforming the three-dimension faces, and acquiring optimal rigid transformation parameters and optimal facial expression parameters.

In some embodiments, in face tracking on the training video facial data, the facial key points $Q_f$ and the facial expression parameters $\delta_f$ of the faces in the plurality of frames of training video data are extracted. The facial key points $Q_f$ are two-dimensional points of face key sites. The facial key points extracted by a pre-trained facial key point detection model, the facial sizes of the faces are determined based on the facial key points of the faces, and the displacements of the plurality of facial regions of the faces relative to the neutral face of the faces are calculated by multiplying the facial expression parameters $Q_f$ by a predetermined blend shape deformer $B_{exp}$. The predetermined blend shape deformer $B_{exp}$ is a tool for producing facial expression animations, and is capable of achieving a smooth and high precision deformation effect of basic objects by target shape objects. In the embodiments of the present disclosure, the blend shape deformer $B_{exp}$ is predetermined for a plurality of users, and the blend shape deformer predetermined for a user is acquired in the case that the video data of the user is determined as the training video data.

In the embodiments of the present disclosure, in the case that the face tracking is performed on the training video, the facial sizes of the faces in the plurality of frames of the video data are acquired, and the displacements of the plurality of facial regions relative to the neutral face are acquired by optimizing rigid transformation parameters and facial expression parameters and are determined as the facial data.

In S103, the model parameters are updated based on the plurality of frames of facial data.

In the embodiments of the present disclosure, the facial data includes facial sizes and the displacements of the plurality of facial regions of faces relative to the neutral face, the faces at different facial sizes extracted from the training video data are organized to a plurality of face containers based on the facial sizes. For the faces in each of the plurality of face containers, an average value of the facial sizes of the faces in the face container is calculated, and in the case that the facial sizes are the average value, data points of the model parameters of the adaptive rigid prior model are acquired by analyzing the displacements of the plurality of facial regions of the faces in the plurality of face containers. Then, the data points of the model parameters corresponding to different average values are interpolated, so as to acquire the model parameters and take the model parameters as new model parameters of the adaptive rigid prior model. The model parameters are functions of the facial sizes, that is, the model parameters are a spline curve. In the spline curve, the facial size is used as an independent variable, and the model parameter is used as a dependent variable.

In S104, whether a condition of stopping updating the model parameters is satisfied is determined.

In the embodiments of the present disclosure, a condition of stopping updating the model parameters is that difference values of the model parameters acquired by two adjacent updates are less than a first predetermined threshold, or the number of updates of the model parameters reaches to a preset number. S105 is performed in the case that the difference values of the model parameters acquired by two adjacent updates are less than the first predetermined threshold. In the case that the difference values of the model parameters acquired by two adjacent updates are greater than or equal to the first predetermined threshold, the process is returned to S102 of acquiring the plurality of frames of facial data of the same face by face tracking on training video data using the adaptive rigid prior model with updated model parameters, and the model parameters are re-updated based on the facial data. In some embodiments, S105 is performed in the case that the number of updates of the model parameters reaches to the preset number. I In the case that the number of updates of the model parameters does not reach to the preset number, the process is returned to S102 of acquiring the plurality of frames of facial data of the same face by face tracking on training video data using the adaptive rigid prior model with updated model parameters, and the model parameters are re-updated based on the facial data.

In S105, updating of the model parameters of the adaptive rigid prior model is stopped in response to the condition of stopping updating the model parameters being satisfied, and a final adaptive rigid prior model is acquired.

In the case that the condition of stopping updating the model parameters is satisfied, the adaptive rigid prior model with finally updated model parameters is a trained model, and the trained adaptive rigid prior model is deployed on a client, a server, or the like. In face tracking, the adaptive rigid prior model is capable of assigning different weights to different regions based on real time facial sizes of the faces and the displacements of the plurality of facial regions of the faces.

In the embodiments of the present disclosure, the model parameters of the adaptive rigid prior model are functions with the facial sizes as independent variables, and the adaptive rigid prior model is configured to output the weights of the plurality of facial regions of the faces at different facial sizes. In the case that the model parameters are initialized, the plurality of frames of facial data of the same face are acquired by face tracking on the training video data using the adaptive rigid prior model, the model parameters are updated based on the plurality of frames of facial data, the model parameters of the adaptive rigid prior model is stopped updating in response to the condition of stopping updating the model parameters being satisfied, and the final adaptive rigid prior model is acquired. In applying the trained adaptive rigid prior model to face tracking, the adaptive rigid prior model is capable of assigning different weights to different regions based on real time facial sizes of the faces and the displacements of the plurality of facial regions of the faces, such that rigidity stabilization of face tracking is improved, and a robust result of face tracking is achieved.

Figure 2A:
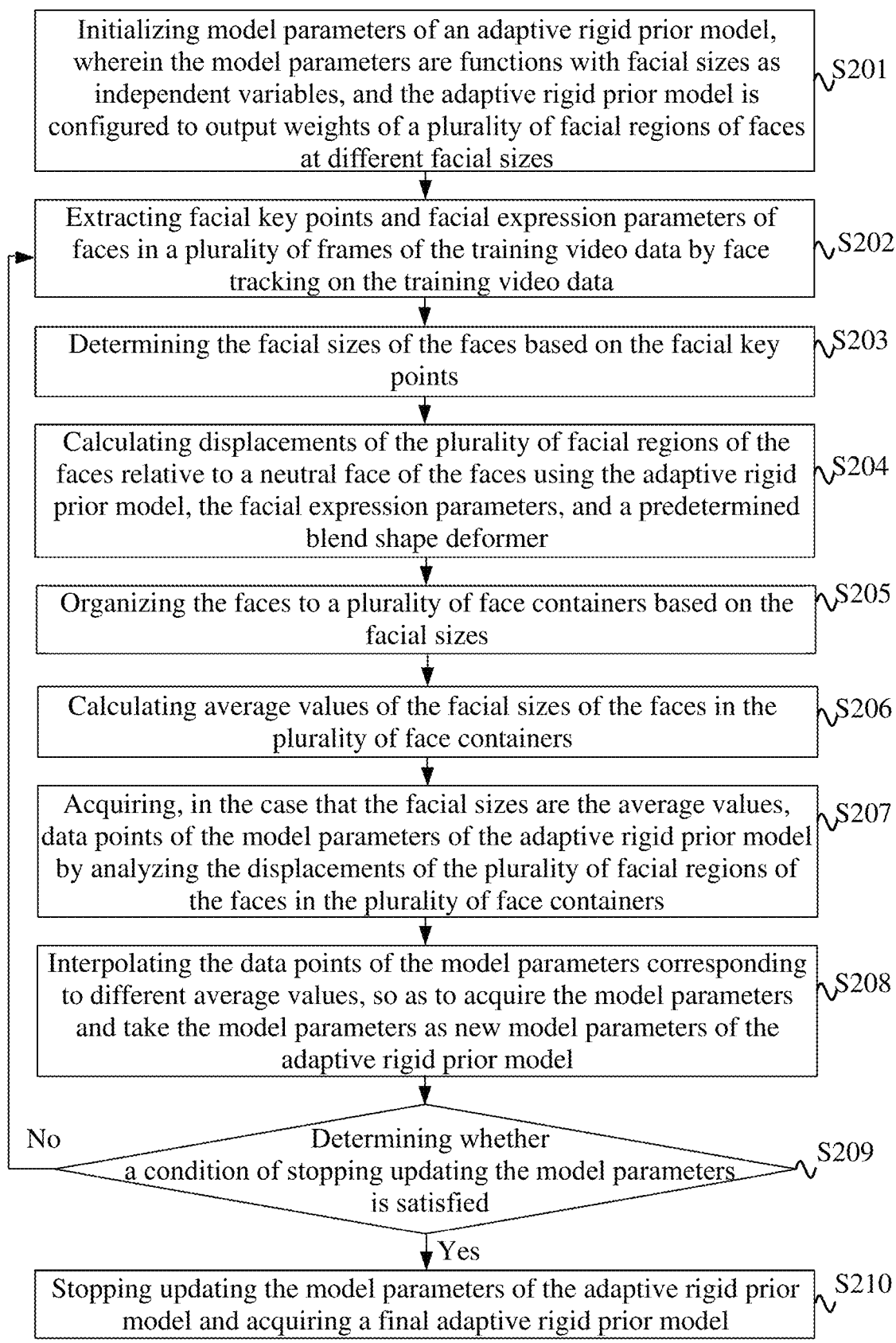
FIG. 2A is a flowchart of steps of another method for training an adaptive rigid prior model according to some embodiments of the present disclosure.

FIG. 2A is a flowchart of steps of another method for training an adaptive rigid prior model according to some embodiments of the present disclosure. The embodiments of the present disclosure are refined on the basis of above embodiment. In some embodiments, as shown in FIG. 2A, the method for training the adaptive rigid prior model according to the embodiments of the present disclosure includes the following steps.

In S201, model parameters of the adaptive rigid prior model are initialized, wherein the model parameters are functions with facial sizes as independent variables, and the adaptive rigid prior model is configured to output weights of a plurality of facial regions of faces at different facial sizes.

In the embodiments of the present disclosure, the adaptive rigid prior model is defined as:

$$w_s^k(d^k) = \begin{cases} \alpha^k(s)\exp\left(-\dfrac{\gamma^k(s)}{\beta^k(s)}\right) & d^k < \gamma^k(s) \\ \alpha^k(s)\exp\left(-\dfrac{d^k}{\beta^k(s)}\right) & d^k \geq \gamma^k(s) \end{cases} \quad (1)$$

s represents the facial size of the face, $w_s^k(\bullet)$ represents a weight of a $k^{th}$ facial region in the face with the facial size being s, $\alpha^k(s)$, $\beta^k(s)$, and $\gamma^k(s)$ represent the model parameters, $\alpha^k(s)$, $\beta^k(s)$, and $\gamma^k(s)$ are functions of two-dimensional facial sizes s, and $d^k$ represents the displacement of the $k^{th}$ facial region.

Figure 2B:
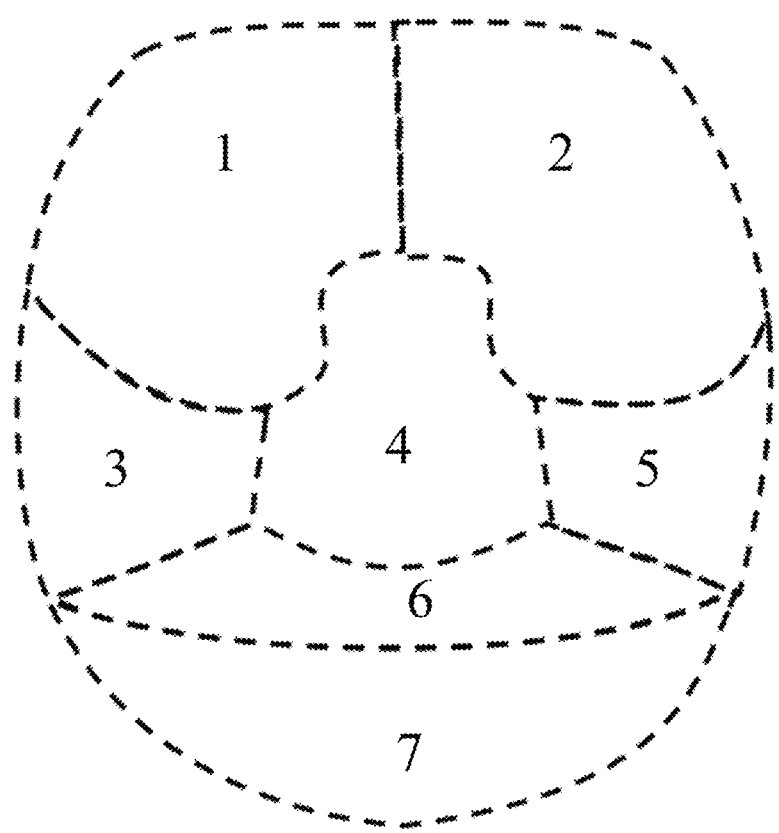
FIG. 2B is a schematic diagram of a division of a plurality of facial regions according to some embodiments of the present disclosure.

FIG. 2B is a schematic diagram of a division of a plurality of facial regions of a face according to some embodiments of the present disclosure. In the embodiments of the present disclosure, the face is divided to seven regions, that is, k is a natural number from 1 to 7. Weights of the plurality of face facial regions of the faces at all facial sizes are initialized to be 1 in initializing the model parameters of the adaptive rigid prior model.

In S202, facial key points and facial expression parameters of faces in a plurality of frames of the training video data are extracted by face tracking on the training video data.

In the embodiments of the present disclosure, for each frame of video data f in the training video data F, a face in each frame of video data f is determined based on following parameters:

$(P_f, \delta_f, Q_f)$.

$P_f$ represents a rigid transformation parameter, $\delta_f$ represents a facial expression parameter, and $Q_f$ represents a facial key point.

The rigid transformation parameter $P_f$ and the facial expression parameter $\delta_f$ are unknown parameters, and facial key point $Q_f$ is a known parameter and is acquired by detecting the facial key point in face tracking.

In S203, the facial sizes of the faces are determined based on the facial key points.

In the case that the facial key points are determined, a face frame is determined based on the facial key points, and a length of a diagonal line of the face frame is used as the facial size of the face in each frame of video data f.

In S204, displacements of the plurality of facial regions of the faces relative to a neutral face of the faces are calculated based on the adaptive rigid prior model, the facial expression parameters, and a predetermined blend shape deformer.

In the embodiments of the present disclosure, three-dimension faces are constructed based on the neutral face, the facial expression parameters, and the predetermined blend shape deformer, and the three-dimension face models is rigidly transformed. A rigid transformation optimization function is constructed based on the weights calculated based on the rigid transformation, the facial key points, and the adaptive rigid prior model. In the case that optimal rigid transformation parameters are acquired by solving the rigid transformation optimization function, optimal facial expression parameters are acquired based on the optimal rigid transformation parameters, and the displacements of the plurality of facial regions of the faces are acquired based on the optimal facial expression parameters.

In the embodiments of the present disclosure, one three-dimension face $F_f$ is determined based on each of the facial expression parameters:

$$F_f = B_{user} + B_{exp}\delta_f.$$

$B_{user}$ represents the neutral face of the user without expression, and the face of the user without expression is pre-acquired, that is, the neutral face. $B_{exp}$ represents a blend shape deformer of the user. The facial displacement $B_{exp}\delta_f$ of the face in the video data f, that is, the three-dimension face, is acquired by adding a plurality of expressions to the neutral face of the user.

In face tracking, the optimal result is acquired by solving the following optimization function:

$$(P_f, \delta_f) = \mathrm{argmin}\left(\sum_i \left\|\prod(P_f(B_{user} + B_{exp}\delta_f))^i - Q_f^i\right\|^2\right).$$

$P_f(\bullet)$ represents the rigid transformation on the three-dimension face $F_f$, $\Pi(\bullet)$ represents a two-dimensional projection (an orthogonal projection or a perspective projection) on the three-dimension face. Above optimization function is solved using a coordinate descent:

$$P_{f,j} = \mathrm{argmin}\left(\sum_i w^{k_i} \left\|\prod(P_f(B_{user} + B_{exp}\delta_{f,j-1}))^i - Q_f^i\right\|^2\right); \quad (2)$$

$$\delta_{f,j} = \mathrm{argmin}\left(\sum_i \left\|\prod(P_{f,j}(B_{user} + B_{exp}\delta_f))^i - Q_f^i\right\|^2\right). \quad (3)$$

The function (2) is the rigid transformation function, $w^{k_i}$ represents a weight of the facial region k of the facial key point i of the face in the training video data f, j represents an iteration number. For initial value $\delta_{f,0} = \delta_{f,1}$, the expression optimization function (3) is iteratively solved. The optimal facial expression parameter $\delta_f$ is acquired in the case that the expression optimization function (3) converges, and the optimal facial expression parameter $\delta_f$ is the expression parameter of last iteration. On this basis, the facial displacement $B_{exp}\delta_f$ of the face in the video data f is calculated, and the displacements of the plurality of facial regions relative to the neutral face are acquired based on the division of the plurality of facial regions shown in FIG. 2B.

In S205, the faces are organized to a plurality of face containers based on the facial sizes.

In the embodiments of the present disclosure, in the case that the face tracking is performed on the training video data, the following facial data is extracted from each frame of video data $f \in F$:

$$(s_f, \{d_f^k\}_{k \in K}).$$

$s_f$ represents the facial size of the face in the video data f, $\{d_f^k\}_{k \in K}$ represents the displacement of the $k^{th}$ facial region of the face in the video data f relative to the neutral face.

In the embodiments of the present disclosure, a histogram analysis is performed on all facial sizes $\{s_f\}_{f \in F}$ of the faces, and the faces extracted from the video data f are organized to n face containers $C_i$. In some embodiments, a maximum facial size and a minimum facial size are first determined, a size range from the maximum facial size to the minimum facial size is evenly divided into a plurality of size ranges, the plurality of size ranges are used as facial size ranges of the plurality of face containers. Target facial size ranges of the facial sizes of the faces are determined, and the faces are organized to face containers within the target facial size ranges.

In some embodiments, the faces are organized to n face containers $C_i$ based on following formula:

$$\left[s_{min} + \frac{i-1}{n}(s_{max} - s_{min}), s_{min} + \frac{i}{n}(s_{max} - s_{min})\right].$$

$s_{min} = \min_{f \in F}\{s_f\}$, that is, the minimum facial size. $s_{max} = \max_{f \in F}\{s_f\}$, that is, the maximum facial size.
A middle value $s^i$ of the facial sizes in the face container is:

$$s^i = s_{min} + \frac{2i-1}{2n}(s_{max} - s_{min}).$$

In the case that the number of faces in the face container $C_i$ is less than a threshold, for example, the number of the faces in the face container $C_i$ is less than 10000, the face container is discarded. In the case that the histogram analysis is performed on the facial sizes:

$$F = \cup_{i=1}^n F_i, F_i \cap F_j = \emptyset, i \neq j.$$

That is, all faces F are a union of faces $F_i$ in the plurality of face containers $C_i$, and an intersection of faces $F_i$ and faces $F_j$ in any two face containers $C_i$ and $C_j$ is null.

In S206, average values of the facial sizes of the faces in the plurality of face containers are calculated.

In some embodiments, for the faces in each of the plurality of face containers $C_i$, $s^i = \mathrm{mean}_{f \in F_i}\{s_f\}$, that is, the average values $s^i$ of the facial sizes of the faces in the plurality of face containers $C_i$ are calculated.

In S207, in the case that the facial sizes are the average values, data points of the model parameters of the adaptive rigid prior model are acquired by analyzing the displacements of the plurality of facial regions of the faces in the plurality of face containers.

In some embodiments, S207 includes following sub-steps.

In S2071, maximum displacements of the plurality of facial regions are determined based on facial image data of the faces for the plurality of facial regions of the faces in the plurality of face containers.

For the plurality of faces in the plurality of face containers $C_i$, each face includes a plurality of facial regions. For each facial region k, the maximum displacement of the facial region k is determined:

$$\eta_i^k = \max_{f \in H_i}\{d_f^k\}.$$

In above formula, $F_i$ is the face in the face containers $C_i$, $\eta_i^k$ is the maximum displacement of the facial region k in the face containers $C_i$.

In S2072, the displacements of the plurality of facial regions are organized to a plurality of displacement containers.

In the embodiments of the present disclosure, for each facial region, a histogram analysis is performed on the displacements of the facial region, and the displacements of the facial region are organized to m displacement containers. For the organization process, reference may be made to S205 of performing the histogram analysis on facial sizes.

In S2073, a displacement container containing a greatest number of displacements in the plurality of displacement containers is determined as a maximum displacement container.

In some embodiments, numbers of the displacements in the plurality of displacement containers are counted, and the displacement container containing a greatest number of displacements is determined as the maximum displacement container.

In S2074, a middle displacement of the plurality of displacements in the maximum displacement container is determined as a data point of a first model parameter.

In some embodiments, the plurality of displacements $d_f^k$ in the maximum displacement container are ranked in descending order or in ascending order, the displacement $\gamma_i^k$ in the middle is determined as the data point of the first model parameter with the face size being the average value, one data point $\{(s^i, \gamma_i^k)\}_{i \in I}$ of the first model parameter is acquired. I={1, 2, . . . , n}, and n is the number of the face containers.

In S2075, a data point of a second model parameter and a data point of a third model parameter are calculated based on the maximum displacements of the plurality of facial regions, the middle displacement, a predetermined maximum weight, a predetermined minimum weight, and the data point of the first model parameter.

In the case that the facial sizes are the average values, the data points of the model parameters of the adaptive rigid prior model include: the data point of the first model parameter, the data point of the second model parameter, and the data point of the third model parameter.

As shown in FIG. 2B, for the division of the facial regions according to the embodiments of the present disclosure, a desired weight range is freely set for each facial region, for example, seven facial regions shown in FIG. 2B. The facial region 1 and the facial region 2 are symmetric, and thus the facial region 1 and the facial region 2 are combined to be trained. Similarly, the facial region 3 and the facial region 5 are combined to be trained. That is, $w_s^1 (\bullet) = w_s^2 (\bullet)$, and $w_s^3 (\bullet) = w_s^5 (\bullet)$. In addition, as the facial region 4 is the nose of the face, the displacement of the nose is least, and the nose is most stable in the case that the user evinces an expression, a greater weight is assigned to the facial region 4. Similarly, the facial region 3 and the facial region 5 include profile points of the face, and is relatively stable, and thus, a greater weight is assigned to the facial region 3 and the facial region 5. The facial region 1 and the facial region 2 are eye portions, the facial region 6 and the facial region 7 are mouth portions, and the displacements of the eye portions and the mouth portions are greater in the case that the user evinces an expression, which may cause instable rigid transformation. Thus, a less weight is assigned to the facial region 1, the facial region 2, the facial region 6, and the facial region 7. The weight ranges of the plurality of facial regions are set as the following table:

| Region k | 1 and 2 | 3 and 5 | 4 | 6 | 7 |
|---|---|---|---|---|---|
| Maximum weight $w_{max}^k$ | 1 | 1.5 | 2 | 1 | 1 |
| Minimum weight $w_{min}^k$ | 0.0001 | 1 | 1 | 0.0001 | 0.0001 |

In practice, a person skilled in the art is capable of dividing the face into the facial regions and setting the corresponding weight ranges in other ways, the means of dividing the facial regions and setting the weight ranges is not limited in the embodiments of the present disclosure.

In the embodiments of the present disclosure, the data point of the second model parameter, and the data point of the third model parameter are calculated in following formulas:

$$\beta_i^k = \frac{\eta_i^k - \gamma_i^k}{\ln \frac{w_{max}^k}{w_{min}^k}}, \text{ and}$$

$$\alpha_i^k = w_{max}^k \exp\left(\frac{\gamma_i^k}{\beta_i^k}\right).$$

In above formulas, $\beta_i^k$ represents the data point of the second model parameter with the facial sizes being the average values, $\alpha_i^k$ represents the data point of the third model parameter with the facial sizes being the average values, $w_{max}^k$ represents the maximum weight of the facial region k, and $w_{min}^k$ represents the minimum weight of the facial region k.

In S208, the model parameters are acquired by interpolating the data points of the model parameters corresponding to different average values, and the model parameters are determined as new model parameters of the adaptive rigid prior model, wherein the model parameters are functions of the facial sizes.

In some embodiments, the first model parameter, the second model parameter, and the third model parameter are acquired by spline interpolating the data point of the first model parameter, the data point of the second model parameter, and the data point of the third model parameter in the case that the facial sizes are the average values, and the first model parameter, the second model parameter, and the third model parameter are determined as the new model parameters of the adaptive rigid prior model. The first model parameter, the second model parameter, and the third model parameter are the functions of the facial sizes. In some embodiments, one spline interpolation is performed on the data points of the plurality of model parameters at different facial sizes, that is, the data points of the plurality of model parameters are connected by straight segments, so as to acquire the functions of the plurality of model parameters and the facial sizes.

As an average value is determined and used as the face sizes for each face container $C_i$, and the data points $\alpha_i^k$, $\beta_i^k$, and $\gamma_i^k$ are determined in the case that the facial sizes are $s^i$ for each face container $C_i$, the following data points are determined for each face container $C_i$:

$$\{(s^i, \alpha_i^k)\}_{i \in I}, \{(s^i, \beta_i^k)\}_{i \in I}, \{(s^i, \gamma_i^k)\}_{i \in I}.$$

The model parameters $\alpha^k(s)$, $\beta^k(s)$, and $\gamma^k(s)$ of the adaptive rigid prior model $w_s^k(\bullet)$ are acquired by interpolating the plurality of data points of the plurality of face containers $C_i$. The model parameters $\alpha^k(s)$, $\beta^k(s)$, and $\gamma^k(s)$ are functions of the facial sizes s, that is, the facial sizes s is the independent variable. That is, in face tracking, in the case that the facial sizes s are determined, the model parameters $\alpha^k(s)$, $\beta^k(s)$, and $\gamma^k(s)$ of the adaptive rigid prior model $w_s^k$ (•) are determined, and the weights of the plurality of facial regions are determined by the adaptive rigid prior model $w_s^k$ (•).

In S209, whether a condition of stopping updating the model parameters is satisfied is determined.

In the embodiments of the present disclosure, difference values between model parameters acquired by two updates are calculated, whether the difference values are less than a first predetermined threshold is determined, and whether the condition of stopping updating the model parameters is satisfied is determined. That is, whether the difference values between model parameters acquired by two updates are less than the first predetermined threshold is determined, and S210 is performed in the case that the condition of stopping updating the model parameters is satisfied. In the case that the condition of stopping updating the model parameters is not satisfied, the face tracking is further performed on the training video data by the adaptive rigid prior model $w_s^k$ (•) with updated model parameters, and the model parameters are further updated based on the data acquired by face tracking.

In practice, the number of updates of the model parameters is counted, and whether the number of updates is greater than a second predetermined threshold is determined. In the case that the number of updates is greater than the second predetermined threshold, the condition of stopping updating the model parameters is satisfied, and thus S210 is performed. In the case that the number of updates is less than or equal to the second predetermined threshold, the process returns to S202.

In S210, updating the model parameters of the adaptive rigid prior model is stopped updating in response to the condition of stopping updating the model parameters being satisfied, and a final adaptive rigid prior model is acquired.

In the case that the condition of stopping updating the model parameters is satisfied, the adaptive rigid prior model with finally updated model parameters is a trained model, and the trained adaptive rigid prior model is deployed on a client, a server, or the like. In face tracking, the adaptive rigid prior model is capable of assigning different weights to different regions based on real time facial sizes of the faces and the displacements of the plurality of facial regions of the faces.

For clearer description of the method for training an adaptive rigid prior model in the embodiments of the present disclosure, illustration is given hereinafter in conjunction with FIG. 2C.

Figure 2C:
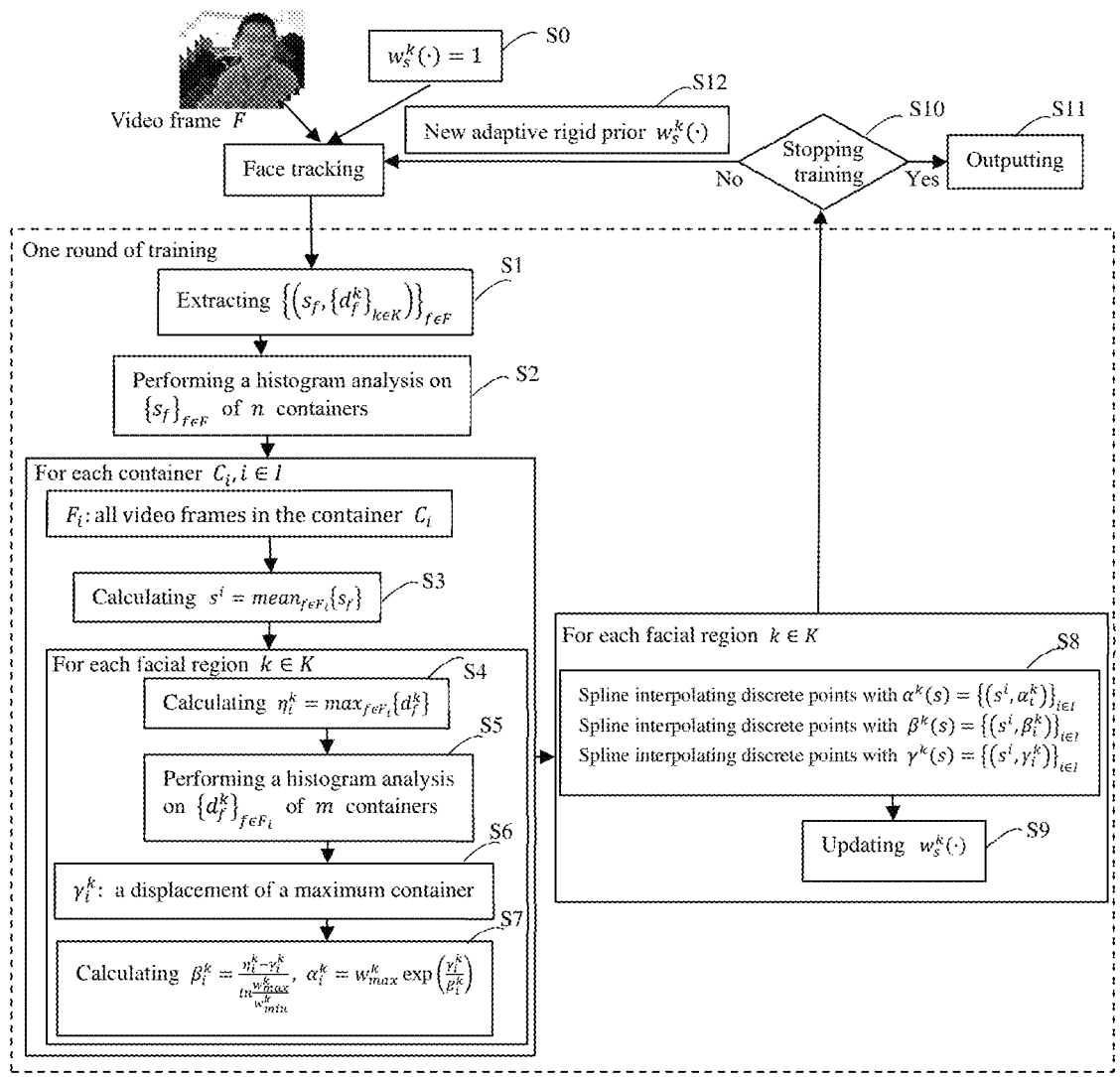
FIG. 2C is a flowchart of training an adaptive rigid prior model according to some embodiments of the present disclosure.

As shown in FIG. 2C, the flowchart of training the adaptive rigid prior model in the example is as follows:

S0, the adaptive rigid prior model $w_s^k$ (•) is initialized to be 1.

That is, the model parameters of the adaptive rigid prior model are initialized, such that the weights of the plurality of facial regions of the faces at different facial sizes are 1.

S1, face tracking is performed on a video data F, and facial data $$\{(s_f, \{d_f^k\}_{k \in K})\}_{f \in F}$$

is extracted.

S2, a histogram analysis is performed on $\{s_f\}_{f \in F}$ of n containers.

S3, for each container $C_i$, $i \in I$, $s^i = \text{mean}_{f \in F_i}\{s_f\}$.

S4, for each facial region $k \in K$, $\eta_i^k = \max_{f \in F_i}\{d_f^k\}$.

S5, a histogram analysis is performed on $\{d_f^k\}_{f \in F_i}$ of m containers.

S6, $\gamma_i^k$ is equal to a middle displacement of a maximum container.

S7, $$\beta_i^k = \frac{\eta_i^k - \gamma_i^k}{\ln \frac{w_{max}^k}{w_{min}^k}},$$

and $$\alpha_i^k = w_{max}^k \exp\left(\frac{\gamma_i^k}{\beta_i^k}\right).$$

S8, for each facial region $k \in K$, discrete points with $\alpha^k(s) = \{(s^i, \alpha_i^k)\}_{i \in I}$, discrete points with $\beta^k(s) = \{(s^i, \beta_i^k)\}_{i \in I}$, and discrete points with $\gamma^k(s) = \{(s^i, \gamma_i^k)\}_{i \in I}$ are spline interpolated.

S9, $w_s^k$ (•) is updated.

S10, whether to stop training is determined, S11 is performed in response to a result of stopping training, and S12 is performed in response to a result of not stopping training.

S11, model parameters are output.

S12, the face tracking is performed using updated $w_s^k$ (•).

For details about the parameters in the formula in above example, reference may be made to S205 to S208, which are not described in detail herein.

In the embodiments of the present disclosure, in the case that the model parameters of the adaptive rigid prior model is initialized, the facial key points and the facial expression parameters of the faces in the plurality of frames of the training video data are extracted by face tracking on the training video data, the facial sizes of the faces are determined based on the facial key points, and the displacements of the plurality of facial regions of the faces relative to the neutral face of the faces are calculated using the adaptive rigid prior model, the facial expression parameters, and the predetermined blend shape deformer. The faces are organized to a plurality of face containers based on the facial sizes, and the average values of the facial sizes of the faces are calculated. In the case that the facial sizes are the average values, the data points of the model parameters of the adaptive rigid prior model are acquired by analyzing the displacements of the plurality of facial regions of the faces in the plurality of face containers. The data points of the model parameters corresponding to different average values are interpolated, so as to acquire the model parameters and determine the model parameters as new model parameters of the adaptive rigid prior model. Updating of the model parameters is stopped in response to the condition of stopping updating being satisfied. Otherwise, the model parameters are further updated by face tracking on the training video data. In applying the trained adaptive rigid prior model to face tracking, the adaptive rigid prior model is capable of assigning different weights to different regions based on real-time facial sizes of the faces and the displacements of the plurality of facial regions of the faces, such that rigidity stabilization of face tracking is improved, and the a result of face tracking is achieved.

In some embodiments, the adaptive rigid prior model is a piecewise function, such that a greater weight caused by less displacement of facial region can be avoided, and the stability of face tracking is ensured.

FIG. 3 is a flowchart of steps of a method for tracking faces according to some embodiments of the present disclosure. The embodiments of the present disclosure are applicable to a case of tracking faces in videos. The method is performed by the apparatus for tracking the faces according to the embodiments of the present disclosure, and the apparatus for tracking the faces is implemented by a hardware or a software, and is integrated in the electronic device according to the embodiments of the present disclosure. In some embodiments, as shown in FIG. 3, the method for training the adaptive rigid prior model according to the embodiments of the present disclosure includes the following steps.

In S301, a plurality of facial key points of a same face, initial facial expression parameters, and initial rigid transformation parameters in a plurality of frames of video data are extracted by face tracking on the video data.

In some embodiments, for the video data for face tracking, the face tracking is performed on the video data to acquire the face in each frame of video data f:

$(P_f, \delta_f, Q_f)$.

$P_f$ represents a rigid transformation parameter, $\delta_f$ represents a facial expression parameter, and $Q_f$ represents a facial key point.

The rigid transformation parameter $P_f$ and the facial expression parameter $\delta_f$ are unknown parameters, and facial key point $Q_f$ is a known parameter and is acquired by detecting the facial key point in face tracking. In the embodiments of the present disclosure, the face is tracked to acquire optimal result of the facial expression parameter $\delta_f$.

In S302, facial sizes of faces in the plurality of frames of video data are determined based on the plurality of facial key points.

In the case that the facial key points are determined, a face frame is determined based on the facial key points, and a length of a diagonal line of the face frame is determined as the facial size of the face in each frame of video data f.

In S303, weights of a plurality of facial regions of the faces are acquired by inputting the facial sizes to a pre-trained adaptive rigid prior model.

In the embodiments of the present disclosure, the adaptive rigid prior model is configured to output the weight of the plurality of facial regions of the faces at different facial sizes, and the adaptive rigid prior model is trained by the method for training the adaptive rigid prior model according to the above embodiments.

In some embodiments, the adaptive rigid prior model is shown as the formula (1) in the above embodiments.

In S304, optimal facial expression parameters are acquired based on the weights of the plurality of facial regions, the plurality of facial key points, the initial rigid transformation parameters, and the initial facial expression parameters, and the optimal facial expression parameters are determined as results of face tracking on the plurality of frames of video data.

In some embodiments, neutral face data of the faces is acquired, three-dimension face models of the faces in the plurality of frames video data are generated based on the neutral face data, the initial facial expression parameters, and a predetermined blend shape deformer, and the three-dimension face models are rigidly transformed. Two-dimensional facial data is acquired by performing, based on the initial rigid transformation parameters, two-dimensional projection on the three-dimension face models, and the two-dimensional facial data includes a plurality of projected two-dimensional key points in one-to-one correspondence to the plurality of facial key points. Distances between the plurality of projected two-dimensional key points and the corresponding plurality of facial key points are calculated, and a rigid transformation optimization function and a facial expression optimization function are constructed based on the weights of the plurality of facial regions of the plurality of projected two-dimensional key points and the distances. Optimal rigid transformation parameters are acquired by optimizing the rigid transformation optimization function, optimal facial expression parameters are acquired by optimizing, based on the optimal rigid transformation parameters, the facial expression optimization function, and the optimal facial expression parameters are determined as the results of face tracking on the plurality of frames of video data.

Referring to S204 in the above embodiments, in the case that the three-dimension face is constructed, the weight $w^{k_i}$ is calculated by the adaptive rigid prior model, the rigid transformation optimization function (2) and the facial expression optimization function (3) are constructed, and the optimal facial expression parameter $\delta_f$ is acquired by sequentially optimizing the function (2) and function (3). For details, reference may be made to the above embodiments, which are thus not repeated herein.

In the case that the facial expression parameter $\delta_f$ is acquired by face tracking, a face vision enhancement special effect is achieved based on the facial expression parameter $\delta_f$, for example, adding hats, glasses, beards, tattoos, and the like to the face.

In the embodiments of the present disclosure, the weights of the plurality of facial regions are acquired by the adaptive rigid prior model, the optimal results of the facial expression parameters are acquired by constructing rigid transformation based on the weights, and the optimal results of the facial expression parameters are determined as the results of face tracking. In the embodiments of the present disclosure, the adaptive rigid prior model is capable of assigning different weights to different regions based on real time facial sizes of the faces and the displacements of the plurality of facial regions of the faces, such that rigidity stabilization of face tracking is improved, and a robust result of face tracking is achieved.

FIG. 4 is a block diagram of an apparatus for training an adaptive rigid prior model according to a fourth embodiment of the present disclosure. As shown in FIG. 4, the apparatus for training the adaptive rigid prior model includes:

a model parameter initializing module 401, configured to initialize model parameters of the adaptive rigid prior model, wherein the model parameters are functions with facial sizes as independent variables, and the adaptive rigid prior model is configured to output weights of a plurality of facial regions of faces at different facial sizes;

a facial data acquiring module 402, configured to acquire a plurality of frames of facial data of a same face by face tracking on training video data using the adaptive rigid prior model;

a model parameter updating module 403, configured to update the model parameters based on the plurality of frames of facial data;

a stopping training condition determining module 404, configured to determine whether a condition of stopping updating the model parameters is satisfied; and a model parameter stopping updating module 405, configured to stop updating the model parameters of the adaptive rigid prior model, and acquire a final adaptive rigid prior model.

The apparatus for training the adaptive rigid prior model is capable of performing the method for training the adaptive rigid prior model according to the above embodiments, and includes corresponding function modules and achieves the beneficial effects of performing the method.

FIG. 5 is a block diagram of an apparatus for tracking faces according to some embodiments of the present disclosure. As shown in FIG. 5, the apparatus for tracking faces includes:

a face tracking module 501, configured to extract a plurality of facial key points of a face, initial facial expression parameters, and initial rigid transformation parameters in a plurality of frames of video data by face tracking on the video data;

a facial size determining module 502, configured to determine facial sizes of faces in the plurality of frames of video data based on the plurality of facial key points;

a weight predicting module 503, configured to acquire weights of a plurality of facial regions of the faces by inputting the facial sizes to a pre-trained adaptive rigid prior model; and an optimizing module 504, configured to acquire optimal facial expression parameters based on the weights of the plurality of facial regions, the plurality of facial key points, the initial rigid transformation parameters, and the initial facial expression parameters, and determine the optimal facial expression parameters as results of face tracking on the plurality of frames of video data;

wherein the adaptive rigid prior model is trained by the method for training the adaptive rigid prior model according to the embodiments of the present disclosure.

The apparatus for tracking the faces according to the embodiments of the present disclosure is capable of performing the method for tracking the faces in the third embodiment, and has corresponding function module and the beneficial effects of performing the method.

FIG. 6 shows a schematic structural diagram of an electronic device according to an embodiment of the present disclosure. As shown in FIG. 6, the electronic device includes: a processor 601, a memory 602, a display screen 603 with a touch function, an input device 604, an output device 605, and a communication device 606. The number of processors 601 in the electronic device is one or more, and FIG. 6 shows the electronic device by taking one processor 601 as an example. The processor 601, the memory 602, the display screen 603, the input device 604, the output device 605, and the communication device 606 in the electronic device are connected via a bus or other ways, and FIG. 6 shows the electronic device by taking the bus as an example. The electronic device is configured to perform the method for training the adaptive rigid prior model and/or the method for tracking the faces according to any one of the embodiments of the present disclosure.

A computer-readable storage medium is provided in the embodiments of the present disclosure. One or more instructions in the storage medium, when loaded and executed by a processor of an electronic device, cause the electronic device to perform the method for training the adaptive rigid prior model and/or the method for tracking the faces according to the above embodiments of the present disclosure.

It should be noted that, for the embodiments of the apparatus, the electronic device, and the storage medium, descriptions are concise because these embodiments are similar to the embodiments of the method, and reference may be made to the description of the embodiments of the method.

In the description of the specification, the terms "one embodiment," "some embodiments," "an example," "some examples" and the like indicates that the features, structures, materials, or characteristics described in conjunction with the embodiment or example are included in at least one embodiment or example of the present disclosure. In the specification, the illustrative description of above terms does not necessarily refer to the same embodiment or example. Furthermore, the described features, structures, materials or characteristics may be combined in any suitable manner in any one or more embodiments or examples.

It is noted that above descriptions are merely some embodiments and technical principle of the present disclosure. A person skilled in the art can understand that the present disclosure is not limited in specific embodiments herein, and a person skilled in the art can make some apparent changes, re-adjustments, and substitutes without departing from the protection scope of the present disclosure. Thus, although detailed description of the present disclosure is made in above embodiments, the present disclosure is not limited in above embodiments. Other equivalent embodiments are included without departing from the conception of the present disclosure, and the scope of the present disclosure is determined by appended claims.

What is claimed is:

1. A method for training an adaptive rigid prior model, comprising:

initializing model parameters of the adaptive rigid prior model, wherein the model parameters are functions with facial sizes as independent variables, and the adaptive rigid prior model is configured to output weights of a plurality of facial regions of faces at different facial sizes;

acquiring a plurality of frames of facial data of a same face by face tracking on training video data using the adaptive rigid prior model;

updating the model parameters based on the plurality of frames of facial data;

determining whether a condition of stopping updating the model parameters is satisfied;

stopping, in response to the condition of stopping updating the model parameters being satisfied, updating the model parameters of the adaptive rigid prior model, and acquiring a final adaptive rigid prior model; and returning, in response to the condition of stopping updating the model parameters being not satisfied, to the step of acquiring the plurality of frames of facial data of the same face by face tracking on the training video data using the adaptive rigid prior model;

wherein the facial data comprises the facial sizes of the faces and displacements of the plurality of facial regions of the faces; and updating the model parameters based on the plurality of frames of facial data comprises:

organizing the faces to a plurality of face containers based on the facial sizes;

calculating average values of the facial sizes of the faces in the plurality of face containers;

acquiring, in a case that the facial sizes are equal to the average values, data points of the model parameters of the adaptive rigid prior model by analyzing the displacements of the plurality of facial regions of the faces in the plurality of face containers; and acquiring the model parameters by interpolating the data points of the model parameters corresponding to different average values of the facial sizes in the plurality of face containers, and determining the model parameters as new model parameters of the adaptive rigid prior model, wherein the model parameters are functions of the facial sizes.

2. The method according to claim 1, wherein acquiring the plurality of frames of facial data of the same face by face tracking on the training video data using the adaptive rigid prior model comprises:

extracting facial key points and facial expression parameters of faces in a plurality of frames of the training video data by face tracking on the training video data;

determining the facial sizes of the faces based on the facial key points; and calculating displacements of the plurality of facial regions of the faces relative to a neutral face of the faces using the adaptive rigid prior model, the facial expression parameters, and a predetermined blend shape deformer.

3. The method according to claim 1, wherein organizing the faces to the plurality of face containers based on the facial sizes comprises:

determining a maximum facial size and a minimum facial size based on facial image data;

evenly dividing a size range from the maximum facial size to the minimum facial size into a plurality of size ranges, and determining the plurality of size ranges as facial size ranges of the plurality of face containers;

determining target facial size ranges of the facial sizes of the faces; and organizing the faces to face containers within the target facial size ranges.

4. The method according to claim 1, wherein acquiring, in the case that the facial sizes are the average values, the data points of the model parameters of the adaptive rigid prior model by analyzing the displacements of the plurality of facial regions of the faces in the plurality of face containers comprises:

determining, based on facial image data of the faces, maximum displacements of the plurality of facial regions of the faces in the plurality of face containers;

organizing the displacements of the plurality of facial regions to a plurality of displacement containers;

determining a displacement container containing a greatest number of displacements in the plurality of displacement containers as a maximum displacement container;

determining a middle displacement of the plurality of displacements in the maximum displacement container as a data point of a first model parameter; and calculating a data point of a second model parameter and a data point of a third model parameter based on the maximum displacements of the plurality of facial regions, the middle displacement, a predetermined maximum weight, a predetermined minimum weight, and the data point of the first model parameter;

wherein in the case that the facial sizes are the average values, the data points of the model parameters of the adaptive rigid prior model comprise: the data point of the first model parameter, the data point of the second model parameter, and the data point of the third model parameter.

5. The method according to claim 4, wherein acquiring the model parameters by interpolating the data points of the model parameters corresponding to the different average values of the facial sizes in the plurality of face containers, and determining the model parameters as the new model parameters of the adaptive rigid prior model comprise:

acquiring the first model parameter, the second model parameter, and the third model parameter by spline interpolating the data point of the first model parameter, the data point of the second model parameter, and the data point of the third model parameter in a case that the facial sizes in the plurality of face containers are the different average values, and determining the first model parameter, the second model parameter, and the third model parameter as the new model parameters of the adaptive rigid prior model.

6. The method according to claim 1, wherein determining whether the condition of stopping updating the model parameters is satisfied comprises:

calculating difference values between model parameters acquired by two updates;

determining whether the difference values are less than a first predetermined threshold; and determining, in response to the difference values being less than the first predetermined threshold, that the condition of stopping updating the model parameters is satisfied.

7. The method according to claim 1, wherein determining whether the condition of stopping updating the model parameters is satisfied comprises:

counting a number of updates of the model parameters;

determining whether the number of updates is greater than a second predetermined threshold; and determining, in response to the number of updates being greater than the second predetermined threshold, that the condition of stopping updating the model parameters is satisfied.

8. The method according to claim 1, wherein the adaptive rigid prior model is:

$$w_s^k(d^k) = \begin{cases} \alpha^k(s)\exp\left(-\dfrac{\gamma^k(s)}{\beta^k(s)}\right) & d^k < \gamma^k(s) \\ \alpha^k(s)\exp\left(-\dfrac{d^k}{\beta^k(s)}\right) & d^k \geq \gamma^k(s) \end{cases} ;$$

wherein s represents the facial size of the face, $w_s^k$ (•) represents a weight of a $k^{th}$ facial region in the face with the facial size being s, $\alpha^k(s)$, $\beta^k(s)$, and $\gamma^k(s)$ represent the model parameters, $\alpha^k(s)$, $\beta^k(s)$, and $\gamma^k(s)$ are functions of two-dimensional facial sizes s, and $d^k$ represent a displacement of the $k^{th}$ facial region.

9. A method for tracking faces, comprising:

extracting a plurality of facial key points of a same face, initial facial expression parameters, and initial rigid transformation parameters in a plurality of frames of video data by face tracking on the video data;

determining facial sizes of faces in the plurality of frames of video data based on the plurality of facial key points;

acquiring weights of a plurality of facial regions of the faces by inputting the facial sizes to a pre-trained adaptive rigid prior model; and acquiring optimal facial expression parameters based on the weights of the plurality of facial regions, the plurality of facial key points, the initial rigid transformation parameters, and the initial facial expression parameters, and determining the optimal facial expression parameters as results of face tracking on the plurality of frames of video data;
wherein the pre-trained adaptive rigid prior model is trained by the method for training the adaptive rigid prior model as defined in claim 1.

10. The method according to claim 9, wherein acquiring the optimal facial expression parameters based on the weights of the plurality of facial regions, the plurality of facial key points, the initial rigid transformation parameters, and the initial facial expression parameters, and determining the optimal facial expression parameters as the results of face tracking on the plurality of frames of video data comprise:
acquiring neutral face data of the faces;
generating three-dimension face models of the faces in the plurality of frames video data based on the neutral face data, the initial facial expression parameters, and a predetermined blend shape deformer, and rigidly transforming the three-dimension face models;
acquiring two-dimensional facial data by performing two-dimensional projection on the three-dimension face models based on the initial rigid transformation parameters, wherein the two-dimensional facial data comprises a plurality of projected two-dimensional key points in one-to-one correspondence to the plurality of facial key points;
calculating distances between the plurality of projected two-dimensional key points and the corresponding plurality of facial key points;
constructing a rigid transformation optimization function and a facial expression optimization function based on the weights of the plurality of facial regions of the plurality of projected two-dimensional key points and the distances;
acquiring optimal rigid transformation parameters by optimizing the rigid transformation optimization function; and
acquiring optimal facial expression parameters by optimizing the facial expression optimization function based on the optimal rigid transformation parameters, and determining the optimal facial expression parameters as the results of face tracking on the plurality of frames of video data.

11. An electronic device for training an adaptive rigid prior model, comprising:
one or more processors;
a memory configured to store one or more programs;
wherein the one or more processors, when loading and executing the one or more programs, are caused to perform:
initializing model parameters of the adaptive rigid prior model, wherein the model parameters are functions with facial sizes as independent variables, and the adaptive rigid prior model is configured to output weights of a plurality of facial regions of faces at different facial sizes;
acquiring a plurality of frames of facial data of a same face by face tracking on training video data using the adaptive rigid prior model;
updating the model parameters based on the plurality of frames of facial data;
determining whether a condition of stopping updating the model parameters is satisfied;
stopping, in response to the condition of stopping updating the model parameters being satisfied, updating the model parameters of the adaptive rigid prior model, and acquiring a final adaptive rigid prior model; and
returning, in response to the condition of stopping updating the model parameters being not satisfied, to the step of acquiring the plurality of frames of facial data of the same face by face tracking on the training video data using the adaptive rigid prior model;
wherein the facial data comprises the facial sizes of the faces and displacements of the plurality of facial regions of the faces; and
updating the model parameters based on the plurality of frames of facial data comprises:
organizing the faces to a plurality of face containers based on the facial sizes;
calculating average values of the facial sizes of the faces in the plurality of face containers;
acquiring, in a case that the facial sizes are equal to the average values, data points of the model parameters of the adaptive rigid prior model by analyzing the displacements of the plurality of facial regions of the faces in the plurality of face containers; and
acquiring the model parameters by interpolating the data points of the model parameters corresponding to different average values of the facial sizes in the plurality of face containers, and determining the model parameters as new model parameters of the adaptive rigid prior model, wherein the model parameters are functions of the facial sizes.

12. A non-transitory computer-readable storage medium, storing one or more computer programs, wherein the one or more programs, when loaded and run by a processor, causes the processor to perform:
initializing model parameters of an adaptive rigid prior model, wherein the model parameters are functions with facial sizes as independent variables, and the adaptive rigid prior model is configured to output weights of a plurality of facial regions of faces at different facial sizes;
acquiring a plurality of frames of facial data of a same face by face tracking on training video data using the adaptive rigid prior model;
updating the model parameters based on the plurality of frames of facial data;
determining whether a condition of stopping updating the model parameters is satisfied;
stopping, in response to the condition of stopping updating the model parameters being satisfied, updating the model parameters of the adaptive rigid prior model, and acquiring a final adaptive rigid prior model; and
returning, in response to the condition of stopping updating the model parameters being not satisfied, to the step of acquiring the plurality of frames of facial data of the same face by face tracking on the training video data using the adaptive rigid prior model;
wherein the facial data comprises the facial sizes of the faces and displacements of the plurality of facial regions of the faces; and
updating the model parameters based on the plurality of frames of facial data comprises:
organizing the faces to a plurality of face containers based on the facial sizes;
calculating average values of the facial sizes of the faces in the plurality of face containers;
acquiring, in a case that the facial sizes are equal to the average values, data points of the model parameters of the adaptive rigid prior model by analyzing the displacements of the plurality of facial regions of the faces in the plurality of face containers; and acquiring the model parameters by interpolating the data points of the model parameters corresponding to different average values of the facial sizes in the plurality of face containers, and determining the model parameters as new model parameters of the adaptive rigid prior model, wherein the model parameters are functions of the facial sizes.

13. A non-transitory computer-readable storage medium, storing one or more computer programs, wherein the one or more programs, when loaded and run by a processor, causes the processor to perform the method for tracking the faces as defined in claim 9.

14. An electronic device for tracking faces, comprising:
one or more processors;
a memory configured to store one or more programs;
wherein the one or more processors, when loading and executing the one or more programs, are caused to perform the method for tracking the faces as defined in claim 9.

15. The electronic device for training the adaptive rigid prior model according to claim 11, wherein the one or more processors, when loading and executing the one or more programs, are caused to perform:
extracting facial key points and facial expression parameters of faces in a plurality of frames of the training video data by face tracking on the training video data;
determining the facial sizes of the faces based on the facial key points; and
calculating displacements of the plurality of facial regions of the faces relative to a neutral face of the faces using the adaptive rigid prior model, the facial expression parameters, and a predetermined blend shape deformer.

16. The electronic device for training the adaptive rigid prior model according to claim 11, wherein the one or more processors, when loading and executing the one or more programs, are caused to perform:
determining a maximum facial size and a minimum facial size based on facial image data;
evenly dividing a size range from the maximum facial size to the minimum facial size into a plurality of size ranges, and determining the plurality of size ranges as facial size ranges of the plurality of face containers;
determining target facial size ranges of the facial sizes of the faces; and
organizing the faces to face containers within the target facial size ranges.

17. The electronic device for training the adaptive rigid prior model according to claim 11, wherein the one or more processors, when loading and executing the one or more programs, are caused to perform:
determining, based on facial image data of the faces, maximum displacements of the plurality of facial regions of the faces in the plurality of face containers;
organizing the displacements of the plurality of facial regions to a plurality of displacement containers;
determining a displacement container containing a greatest number of displacements in the plurality of displacement containers as a maximum displacement container;
determining a middle displacement of the plurality of displacements in the maximum displacement container as a data point of a first model parameter; and
calculating a data point of a second model parameter and a data point of a third model parameter based on the maximum displacements of the plurality of facial regions, the middle displacement, a predetermined maximum weight, a predetermined minimum weight, and the data point of the first model parameter;
wherein in the case that the facial sizes are the average values, the data points of the model parameters of the adaptive rigid prior model comprise: the data point of the first model parameter, the data point of the second model parameter, and the data point of the third model parameter.

18. The electronic device for training the adaptive rigid prior model according to claim 17, wherein the one or more processors, when loading and executing the one or more programs, are caused to perform:
acquiring the first model parameter, the second model parameter, and the third model parameter by spline interpolating the data point of the first model parameter, the data point of the second model parameter, and the data point of the third model parameter in a case that the facial sizes in the plurality of face containers are the different average values, and determining the first model parameter, the second model parameter, and the third model parameter as the new model parameters of the adaptive rigid prior model.

* * * * *